United States Patent
Munson

[19]

[11] Patent Number: 6,109,575

[45] Date of Patent: Aug. 29, 2000

[54] APPARATUS AND METHOD FOR MOUNTING AN INSTRUMENT

[75] Inventor: Robert H. Munson, Charlottesville, Va.

[73] Assignee: Litton Marine Systems Inc., Charlottesville, Va.

[21] Appl. No.: 09/107,199

[22] Filed: Jun. 29, 1998

[51] Int. Cl.[7] ................................................ F16M 11/00
[52] U.S. Cl. ........................................ 248/200; 248/27.1
[58] Field of Search .................................. 248/200, 27.1,
248/904, 222.52, 674, 222.41, 223.21, 222.14,
221.12, 227.52; 74/6, 553; 403/287, 3,
4; 280/661, 96.1

[56] References Cited

U.S. PATENT DOCUMENTS

| | | | |
|---|---|---|---|
| 3,293,924 | 12/1966 | Costelli | 74/6 |
| 3,500,531 | 3/1970 | Wright | 29/401.1 |
| 3,599,910 | 8/1971 | Wipff | 248/27 |
| 3,894,782 | 7/1975 | Hug | 248/27.1 X |
| 4,154,125 | 5/1979 | Frank | 74/553 |
| 4,363,461 | 12/1982 | Smejkal | 248/27.1 X |
| 4,601,378 | 7/1986 | Pierce et al. | 248/674 X |
| 4,921,271 | 5/1990 | Berry et al. | 280/661 |
| 5,105,637 | 4/1992 | Kovens | 70/491 |
| 5,163,335 | 11/1992 | Isom et al. | 74/6 |
| 5,299,880 | 4/1994 | Bouchard | 403/3 |
| 5,366,312 | 11/1994 | Raines | 403/3 |
| 5,742,140 | 4/1998 | Gustafson | 248/200 |

*Primary Examiner*—Ramon O. Ramirez
*Assistant Examiner*—Tan Le
*Attorney, Agent, or Firm*—Seymour Levine; Gerald L. Lett

[57] ABSTRACT

An instrument mounting apparatus includes a bracket into which the instrument is inserted, a washer which slides over the instrument and dimensioned to hold the instrument, and a nut which also slides over the instrument. The bracket has key slots for accepting keys extending from the washer and has threads on the outer surface which mate with threads on the inner surface of the nut. Radial slots in the nut permit the insertion of a rod for torquing the nut tight to the bracket, while tapped channels are provided for a inserting a set screw into the one most convenient.

12 Claims, 4 Drawing Sheets

APPARATUS AND METHOD FOR MOUNTING AN INSTRUMENT

BACKGROUND OF THE INVENTION

1. Field of the Invention

The invention pertains to the field of instrument positioning and more particularly to clamping an instrument at a desired location while maintaining the ability to easily align and remove it.

2. Description of the Prior Art

In feedback control systems comparisons are made between a control signal and a command signal. The instrument used to effect this comparison is generically called an error detector, because it usually subtracts the two signals, thus producing a difference, or error, signal. One such error detector is a synchro. A synchro transmitter is a transformer having one winding (rotor) rotatable with respect to a second winding (stator). When properly energized, the relative position of the rotor to the stator establishes a set of stator output signals which describe accurately the angular position of its shaft with respect to the stator. Thus, if the stator is positioned to define a reference for angular positions of the rotor shaft, the stator output signals may be utilized to establish the angular position of the rotor shaft relative to the selected reference.

In the prior art a synchro transmitter was clamped in position by three screws, with a D clamp washer on each, passed through screw holes equiangularly positioned in a flange of the synchro transmitter casing and screwed into the mounting surface. In many applications the synchro transmitter is positioned such that at least one of the screws is difficult to access. This access difficulty makes the synchro difficult to install, adjust, and replace.

It is an object of the present invention to provide a clamping mechanism which facilitates the installment, adjustment, and replacement of a synchro regardless of its physical location.

SUMMARY OF THE INVENTION

In accordance with the present invention an instrument mounting apparatus includes a bracket, into which the instrument is inserted; a washer, which slides around the instrument; and a nut, which slides around the instrument and is fastened to the bracket. The washer is constructed to engage the instrument and includes three keys which mate with corresponding slots provided in the bracket, while the outer surface of nut has threads which mate with threads on the inner surface of the bracket and an internal face which contacts an external face of the washer. Tightening the nut to the bracket firmly clamps the instrument in place.

DESCRIPTION OF THE PREFERRED EMBODIMENTS

Figure 1:
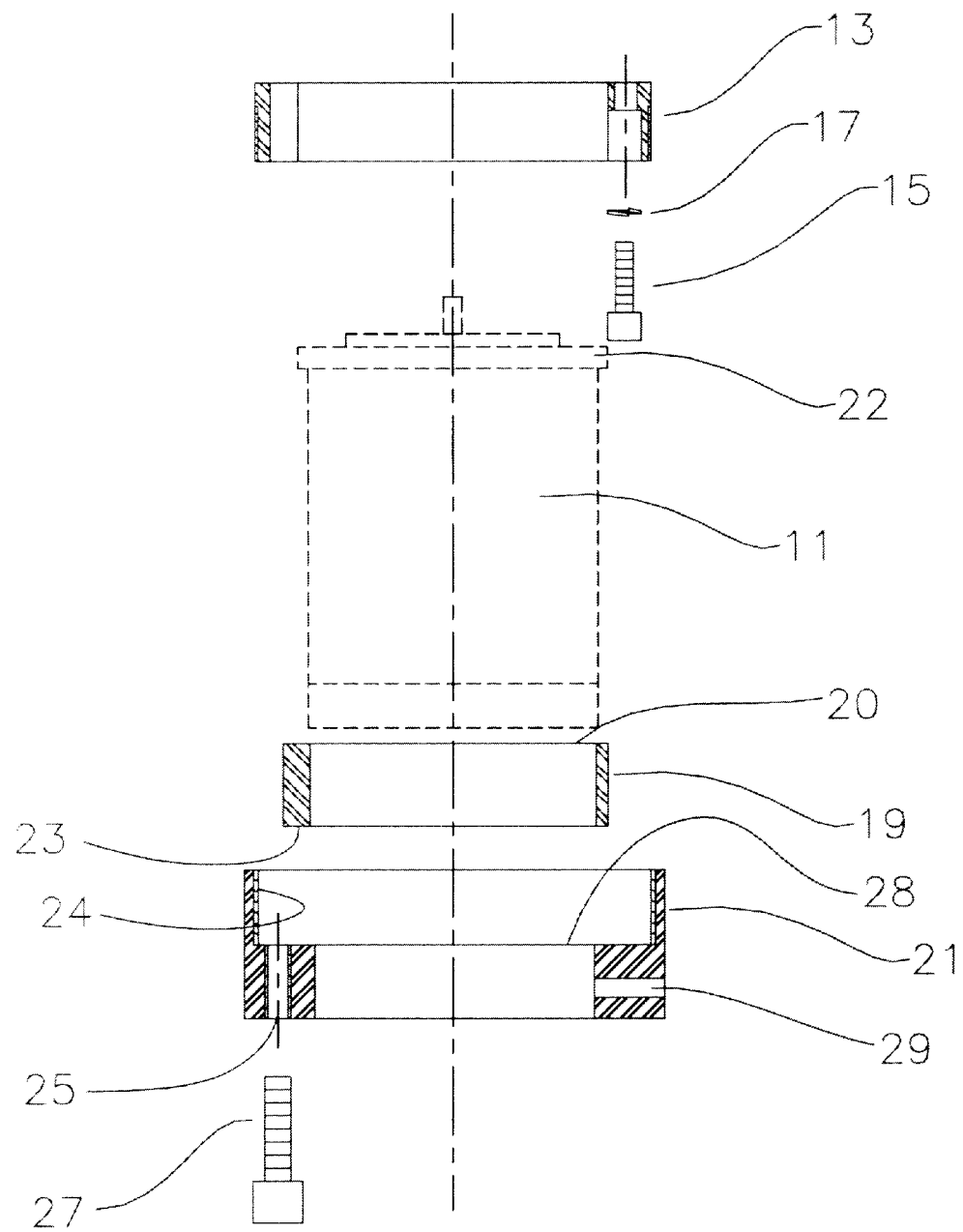
FIG. 1 is an assembly drawing of the invention utilizing element cross-section views.

The invention will be described with reference to the figures, wherein like elements bear the same reference numerals.

Figure 2B:
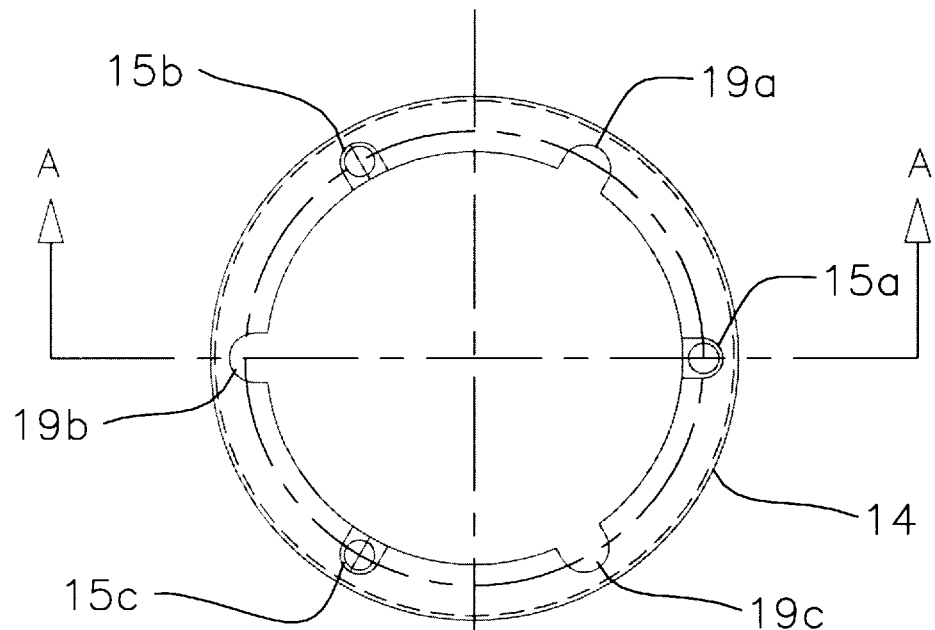
FIGS. 2A and 2B are top and cross-sectional views, respectively, of a spacer which may be utilized in the assembly of FIG. 1.
Figure 2A:
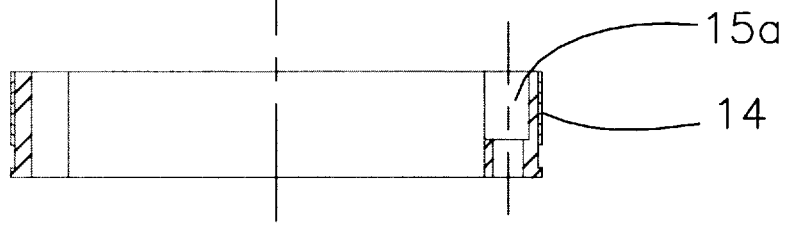

Refer now to FIG. 1, wherein an assembly drawing of a preferred embodiment of the invention is shown with cross-sectional views of the elements. In accordance with the invention, as shown in the figure, an apparatus for mounting an instrument such as a synchro 11 includes a bracket, such as a spacer 13, which is mounted on the mounting surface by fastening means such as a plurality of bolts 15 respectively passed through washers 17 and screwed into a threaded hole on the mounting surface, not shown. The spacer 13, cross-sectional and top views of which are shown in FIGS. 2B and 2A, respectively, includes a threaded outer surface 14, three equiangularly spaced bolt passage channels 15a, 15b, and 15c through which the bolts 15 are passed for securing the spacer 13 to the mounting surface, and three key slots 19a, 19b, and 19c, the purpose of which will be explained subsequently. Though three bolt passage channels and three key slots are preferred, it should be understood that the number of bolt passage channels and key slots need not be equal and that a greater or a lesser number of bolt passage channels and key slots may be utilized.

Figure 3A:
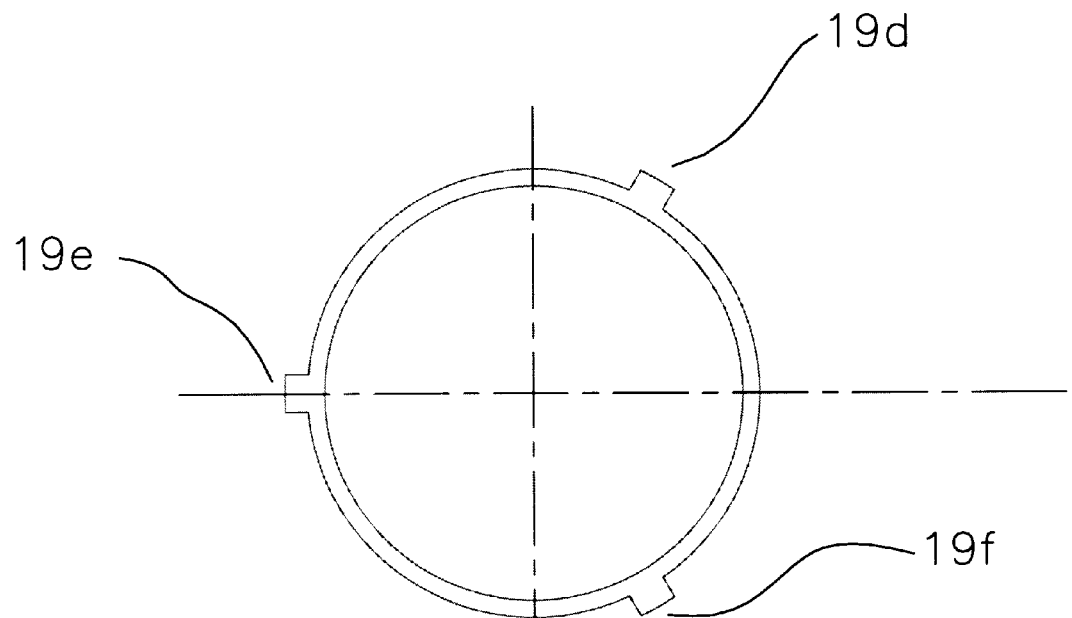
FIGS. 3A and 3B are top and side views, respectively, of a washer which may be utilized in the assembly of FIG. 1.
Figure 3B:
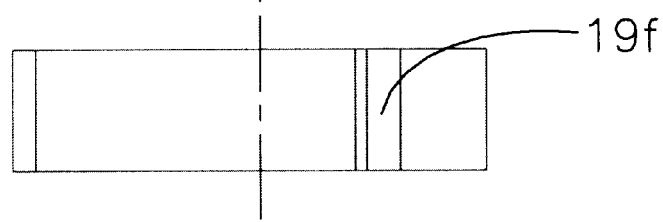

Still referring to FIG. 1, the synchro 11 is inserted into the spacer 13 and a washer 19, the top and side views of which are shown in FIGS. 3A and 3B, respectively, is slid over the synchro. The washer 19 includes three equiangularly spaced keys 19d, 19e, and 19f which are guided into the three key slots 19a, 19b, and 19c of the spacer 13. A surface 20 of the washer 19 engages a lip 22 on the synchro to retain the synchro in place after clamping. Since the keys and key slots are equiangularly positioned the washer need not have any specific angular orientation to the spacer other than having each key seated in a key slot. Though the number of keys and key slots need not be equal and may be more or less than three, there must a sufficient number of key slots to seat each key.

Figure 4A:
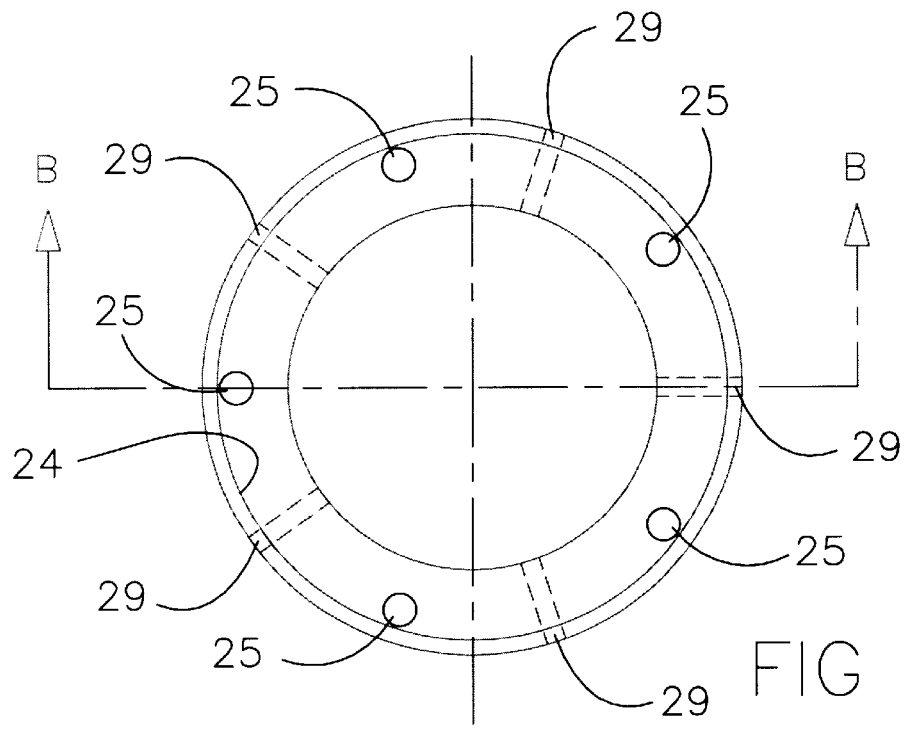
FIGS. 4A and 4B are top and cross-sectional views, respectively, of a nut which may be utilized in the assembly of FIG. 1.
Figure 4B:
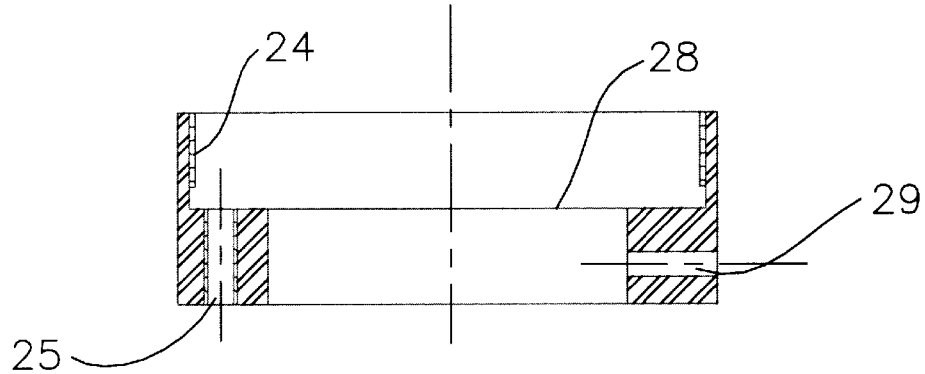

With the spacer 13 and washer 19 in place, a nut 21, the top and cross-sectional views of which are shown in FIGS. 4A and 4B respectively, is slid over the synchro 11. The nut 21 includes an inner surface 24 threaded to match the threads on the outer surface of the spacer 13, a plurality of channels 25 threaded to match the threads of a set screw 27 (FIG. 1), and a multiplicity of radial slots 29, the purpose of which is yet to be explained. The nut is screwed onto the spacer and hand tightened, maintaining the keys of the washer 19 in the key slots of the spacer 13 and seating an end surface 23 of the washer 19 onto an inner surface 28 of the nut 21. After hand tightening, the synchro may be rotated to its correct angular position and clamped in place by inserting a rod, not shown, into the most accessible radial slot 29 and using the rod as a lever arm to tighten the nut to the spacer, thereby clamping the synchro in place. The set screw 27 is then threaded through the most accessible of the channels 25 and tightened to maintain the clamp.

Should the synchro 11 need subsequent adjustment or replacement, the set screw 27 may be loosened and a rod inserted into the most accessible radial slot 29 to loosen the nut 21 from the spacer 13 so that the synchro may be rotated or the nut removed from the spacer so that the synchro may be replaced.

While the invention has been described in its preferred embodiments, it is to understood that the words that have been used are words of description rather than limitation and that changes may be made within the purview of the appended claims without departing from the true scope and spirit of the invention in its broader aspects.

I claim:

1. An apparatus for mounting an instrument on a surface comprising:

a bracket, having a threaded outer surface, constructed and arranged to be fastened to said surface and for inserting said instrument therein;

a washer constructed to slide over and engage said instrument;

means for coupling said washer to said bracket;

a nut constructed to slide over said instrument, said nut having an internal surface on which to seat an external end surface of said washer, a tapped channel for inserting a set screw, and a threaded inner surface that matches said threaded outer surface of said bracket.

2. An apparatus in accordance with claim 1 wherein said washer coupling means includes a plurality of key slots in said bracket and a multiplicity of keys on said washer, said multiplicity of keys positioned for mating with a multiplicity of said key slots.

3. An apparatus in accordance with claim 2 wherein said key slots and said keys are of equal number.

4. An apparatus in accordance with claim 3 wherein said equal number of key slots and said keys is three.

5. An apparatus in accordance with claim 1 wherein said nut includes a multiplicity of radial slots for inserting a torquing device with which to tighten said nut to said bracket.

6. A method for mounting an instrument to a surface comprising the steps of:

fastening a bracket on said surface, said bracket having key slots therein and a threaded external surface;

inserting said instrument into said bracket, said instrument having a lip;

sliding a washer having keys thereon over said instrument such that said keys are inserted in said key slots and a surface of said washer contacts said lip;

sliding a nut over said instrument, said nut having internal threads matching said threads on said bracket and a multiplicity of radial slots for inserting a torquing device;

threading said nut onto said bracket; and tightening said nut with a torquing device inserted in one of said radial slots such that an inner surface of said nut is in contact with an external surface of said washer.

7. A method in accordance with claim 6 wherein said nut has a plurality of threaded channels and further including the step of threading a set screw through at least one of said threaded channels and tightening said set screw.

8. A method in accordance with claim 6 wherein said nut has a plurality of threaded channels, and further including the step of threading a set screw through at least one of said threaded channels and tightening said set screw.

9. An instrument clamping apparatus comprising:

a bracket, having a threaded outer surface, constructed and arranged for mounting on a surface and inserting said instrument therein;

a washer constructed to slide over said instrument;

means for coupling said washer to said bracket;

a nut, having a threaded inner surface for mating to said threaded outer surface of said bracket, said nut constructed to slide over said instrument and further having an internal surface on which to seat an external end surface of said washer and a multiplicity of radial slots for inserting a torquing device with which to tighten said nut to said bracket.

10. An apparatus in accordance with claim 9 wherein said washer coupling means includes a plurality of key slots in said bracket and a multiplicity of keys on said washer, said multiplicity of keys positioned for mating with a multiplicity of said key slots.

11. An apparatus in accordance with claim 10 wherein said key slots and said keys are of equal number.

12. An apparatus in accordance with claim 11 wherein said equal number of key slots and said keys is three.

* * * * *